US009652895B2

(12) United States Patent
Sumner et al.

(10) Patent No.: US 9,652,895 B2
(45) Date of Patent: May 16, 2017

(54) AUGMENTED REALITY IMAGE TRANSFORMATION

(71) Applicant: Disney Enterprises, Inc., Burbank, CA (US)

(72) Inventors: Robert Sumner, Zürich (CH); Maurizio Nitti, Zürich (CH); Gerhard Roethlin, Horw (CH); Alessia Marra, Zürich (CH); Mattia Ryffel, Bern (CH); Gioacchino Noris, Zürich (CH); Kenny Mitchell, Addlestone (GB); Stephane Magnenat, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 66 days.

(21) Appl. No.: 14/626,799

(22) Filed: Feb. 19, 2015

(65) Prior Publication Data

US 2015/0254903 A1    Sep. 10, 2015

Related U.S. Application Data

(60) Provisional application No. 61/949,185, filed on Mar. 6, 2014.

(51) Int. Cl.
*G06T 15/00* (2011.01)
*G06T 19/00* (2011.01)
(Continued)

(52) U.S. Cl.
CPC ............ *G06T 19/006* (2013.01); *G06T 15/02* (2013.01); *G06T 15/04* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| 8,866,841 | B1 * | 10/2014 | Distler | G06T 11/60 345/619 |
| 2012/0249535 | A1 * | 10/2012 | Castineiras | G06Q 30/02 345/419 |

(Continued)

OTHER PUBLICATIONS

Clark et al., An Interactive Augmented Reality Coloring Book, Mar. 2012, 2012 IEEE Symposium on 3D User Interfaces (3DUI), pp. 7-10.*

(Continued)

*Primary Examiner* — Andrew G Yang
(74) *Attorney, Agent, or Firm* — Farjami & Farjami LLP (57) ABSTRACT

There is provided a system and method for augmented reality image transformation. In one implementation, such a system includes a system processor, a system memory, and an image transformation engine stored in the system memory. The system processor is configured to execute the image transformation engine to receive image data corresponding to an image, to detect a feature on a surface of the image, and to synthesize a texture corresponding to the feature. The system processor is further configured to execute the image transformation engine to produce an augmented reality representation of the image having the texture for display to a user, the texture covering a surface of the augmented reality representation of the image corresponding to a portion of the feature that is not visible on the surface of the image.

15 Claims, 10 Drawing Sheets

(51) Int. Cl.
G06T 15/04 (2011.01)
G06T 15/02 (2011.01)
G06T 19/20 (2011.01)

(56) References Cited

U.S. PATENT DOCUMENTS

2012/0249586 A1* 10/2012 Wither ............... H04N 1/00323
345/633
2014/0282220 A1* 9/2014 Wantland ............ G06F 3/04845
715/782
2014/0354686 A1* 12/2014 Mullins ................ G06T 19/006
345/633
2015/0187136 A1* 7/2015 Grimaud ................ G06T 17/00
345/420

OTHER PUBLICATIONS

"Open GL Programming Guide", Chapter 13, Woo et al., Jan. 1997 http://www.glprogramming.com/red/chapter13.html.

* cited by examiner

```
procedure GENERATELOOKUP(M,I,L_Φ,W,O)
    ▷ First approximation
    L ← ∅
    for i in enumerate(I) do
        G ← generate gradient for island i
        L^i ← L_Φ^i
        for p in sorted(Ω^i, G) do
            d, p' ← 0, p
            while p' ∉ L_Φ^i do                    ▷ until source
                p' ← descend G from p'
                d ← d + 1                          ▷ count distance in target
            end while
            v ← incoming direction
            while d > 0 do
                if p' ∉ L^i then                   ▷ unknown mapping
                    v ← −v                         ▷ reverse direction
                else
                    L^i[p] ← L^i[p']               ▷ copy mapping
                end if
                rotate v using O[p']
                p' ← p' + v
                d ← d − 1
            end while
        end for
        L ∪ L^i
    end for
    FIXBROKENPOINTS()
    ▷ Relaxation
    e ← ∞
    for c in range(c_max) do
        L, e' ← RELAXLOOKUP(L,W)
        if e' > e then
            break
        end if
        e ← e'
    end for
    return L
end procedure
```

Fig. 7B

```
                                                    702 procedure RELAXLOOKUP(L, W)
    e_tot ← 0
    L' ← 0 of size L
    for p in enumerate(L) do              ▷ list all points in L
        l' ← L[p]
        for q in neigbors(p) ∪ W(p) do
            if not valid q then
                continue      ▷ different islands or out of bounds
            end if
            D ← L[q] − L[p]              ▷ distance in mapping space
            d ← |D|
            if d ≠ 0 then
                e ← 1 − (α·d−tanh(α·d−α))/α    ▷ error in position
                e_tot ← e_tot + e²              ▷ sum of square errors
                l' ← l' − e·ε
            end if
        end for
        if is valid l' then            ▷ correct island and in bounds
            L'[p] = l'
        else
            L'[p] = L[p]
        end if
    end for
    return L', e_tot
end procedure
```

AUGMENTED REALITY IMAGE TRANSFORMATION

RELATED APPLICATIONS

The present application claims the benefit of and priority to a pending Provisional Patent Application Ser. No. 61/949,185, filed Mar. 6, 2014, and titled "Augmented Reality Color Books with Feature-Based Texture Synthesis," which is hereby incorporated fully by reference into the present application.

BACKGROUND

The convenience and immediacy of modern electronic based information and entertainment technologies are seductive, and have increasingly lured users away from more tangible media, and especially print media such as books. The public discourse surrounding the progressive migration of readers and other users of print media to their corresponding electronic media versions has often been negative, tending to lament the growing estrangement from an approach to learning and entertainment that has played a major role in shaping the foundations of our culture.

However, books and other forms of tangible media are being supplanted by electronic content for numerous valid and progressive reasons. For example, electronic content enables great storage and distribution efficiencies. In addition, growing awareness of the fragility of the Earth's ecosystem, and the pressures applied by our collective demands on limited sustainable resources militate for approaches to information storage and communication that minimizes that environmental cost.

Nevertheless, some forms of tangible media have resisted translation into electronic form due to the physically interactive nature of their relationships with their users. The relationship of the artist to her canvas or sketchpad, and that of a child to a coloring book, for example, is not easily substituted by a conventional electronic user interface. Thus, a solution enabling transformation of tangible images produced or modified by hand into augmented reality representations of those images in real-time is desirable in order to more fully extend the advantages accruing from use of electronic media to the creative work of artists and to the creative play of children.

SUMMARY

There are provided systems and methods for performing augmented reality image transformation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, in contrast to print media such as books, some forms of tangible media have resisted translation into electronic form due to the physically interactive nature of their relationships with their users. The relationship of the artist to her canvas or sketchpad, and that of a child to a coloring book, were cited as examples of creative interactions that are not easily substituted by a conventional electronic user interface. However, in view of the efficiencies and reduced environmental costs accruing from use of electronic media, it is desirable to more fully extend those benefits to the activities of creatively interactive users of media such, as artists and children, for example.

The present application discloses a system and method for performing augmented reality image transformation. The solution disclosed in the present application allows typical users of media content dominated by visual imagery, such as artists, draftspersons, and children, to interact with augmented reality representations of images created or modified by the users.

In some implementations, user interactions with augmented reality representations of images created or modified by the user can occur in real-time. In addition, in some implementations, the user can interact with a virtual three-dimensional (3D) representation of a tangible two-dimensional (2D) image created or modified by the user. Moreover, in some implementations, synthesized textures on the augmented reality representation, which correspond to features on the image created or modified by the user, can be synthesized on a surface of the augmented reality representation corresponding to portions of the feature not visible on the original image. For example, a synthesized texture corresponding to a feature shown in a frontal view of a 2D image appearing on an art canvas or a page of a book may be propagated to the back and/or sides of a virtual 3D augmented reality representation of the 2D image.

Figure 1:
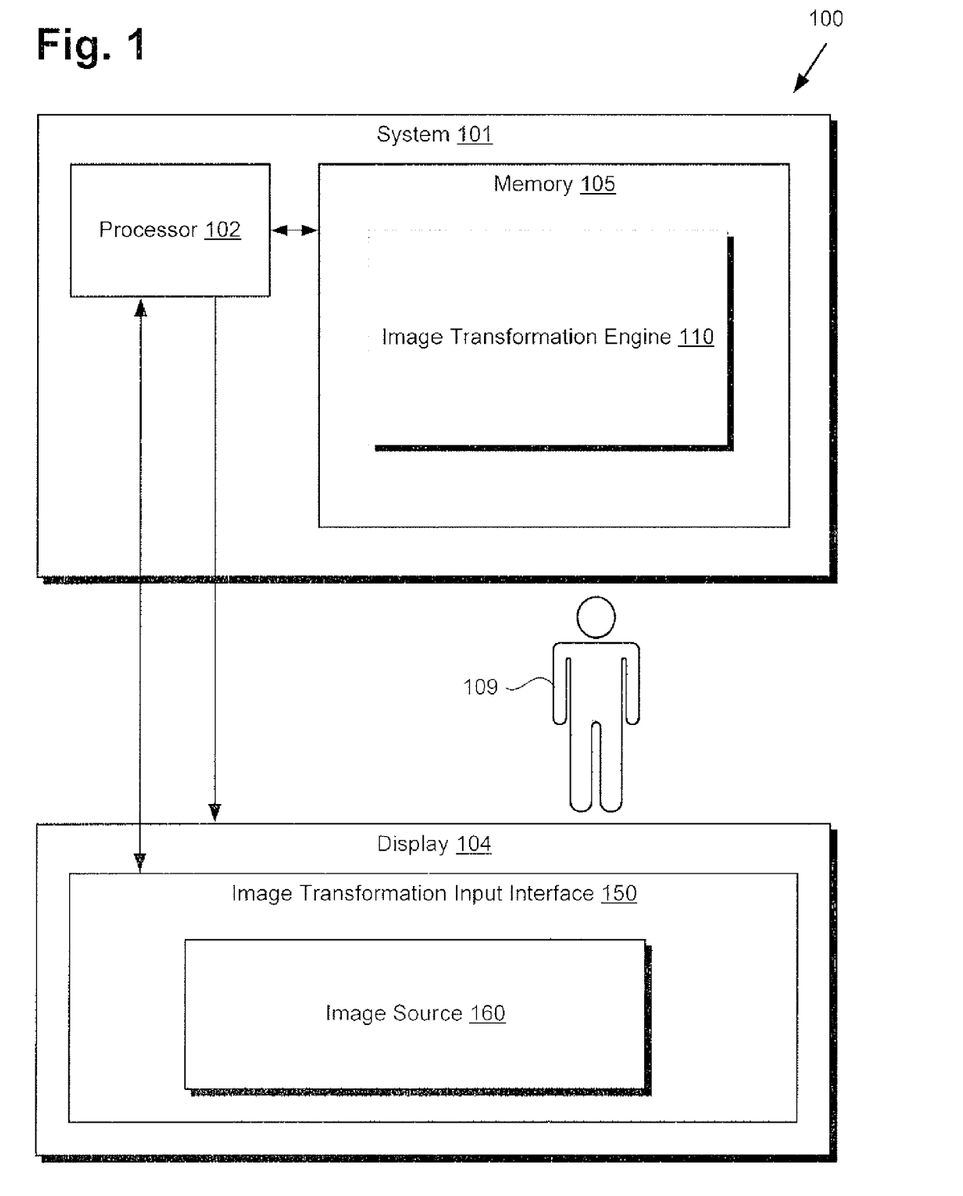
FIG. 1 shows a diagram of an exemplary system configured to perform augmented reality image transformation, according to one implementation.

FIG. 1 shows a diagram of exemplary system 101 configured to perform augmented reality image transformation, according to one implementation. As shown in FIG. 1, system 101 includes system processor 102 and system memory 105 storing image transformation engine 110. As further shown in FIG. 1, system 101 is situated in augmented reality image transformation environment 100 with user 109 and display 104 including image transformation input interface 150 and image source 160. It is noted that although FIG. 1 depicts system 101 and display 104 as distinct components, in some implementations, display 104 may be integrated with system 101 so as to be a feature of system 101.

According to the implementation shown by FIG. 1, user 109 may create or modify one or more images on image source 160 using image transformation input interface 150 of display 104. As a specific example, user 109 may be an artist using an electronic painting or drawing application providing image source 160 on display 104. User 109 may create a new image on image source 160, or may modify a pre-existing image template on image source 160, for example by adding features or colors to the image template. Data corresponding to the user created or modified image on image source 160 (i.e., image data) may then be communicated to system 101 by image transformation input interface 150, where it can be processed by system 101.

In some implementations, system 101 may be a computing system or computing device providing a workstation for user 109. In other implementations, system 101 may be implemented as a personal computer (PC), or as another type of personal communication device, such as a tablet computer, smartphone, digital media player, or gaming console, among other examples. System processor 102 may be the central processing unit (CPU) for system 101, for example, in which role system processor 102 runs the operating system for system 101 and executes image transformation engine 110 stored in system memory 105.

In the exemplary implementation of FIG. 1, user 109 can utilize system 101 to produce an augmented reality representation of the user created or modified image on image source 160. In other words, system processor 102 can be configured to execute image transformation engine 110 to receive image data corresponding to the user created or modified image on image source 160, and to detect one or more features on a surface of the image. In addition, system processor 102 can be configured to execute image transformation engine 110 to synthesize a texture corresponding to the feature, and to produce an augmented reality representation of the user created or modified image for display to the user, for example, on display 104.

The texture synthesis performed by image transformation engine 110 may be an example based texture synthesis process that uses the image or image modification produced by user 109 as an exemplar. Such example based texture synthesis is one of the most versatile, powerful, and widely used techniques in image processing. An exemplar may be synthesized into a high quality texture of arbitrary size, which may then be utilized for image modification, 3D texture mapping, and other image processing tasks.

The texture synthesis may also be augmented by techniques such as texture by numbers (TBN), allowing users to specify various additional constraints and texture areas for high quality, visually consistent renderings with user defined art direction. In one implementation, for example, the texture synthesis may include generating a UV Texture for a 3D augmented reality representation of the user created or modified image, generating a special Unique UV Texture, generating a UV Island Map, and generating a UV Mask. The texture synthesis process may further include rendering the 3D augmented reality representation with the special Unique UV Texture as input and processing the rendering together with the UV Island image and the UV Mask.

As will be explained in greater detail below, the exemplary augmented reality image transformation system depicted in FIG. 1 may be adapted to many different implementational configurations. For example, and as noted above, display 104 may be a discrete component interactively linked to system 101, or may be an integral feature of system 101. In addition, although image source 160 is shown as a feature of display 104 with which user 109 can interact, in other implementations, image source 160 may itself be a tangible component separate from display 104. For instance, image source 160 may be a page in a book, or a sketch pad or artist's canvas.

In those implementations in which image source 160 is a tangible and discrete image source, image transformation input interface 150 may take the form of a camera, for example, configured to capture the user created or modified image on image source 160 and to transform the captured image to produce image data corresponding to that image. Moreover, when implemented as a camera, image transformation input interface 150 may be a digital camera including a complementary metal-oxide-semiconductor (CMOS) or charged coupled device (CCD) image sensor configured to transform the user created or modified image to produce digital image data for processing by image transformation engine 110.

Figure 2:
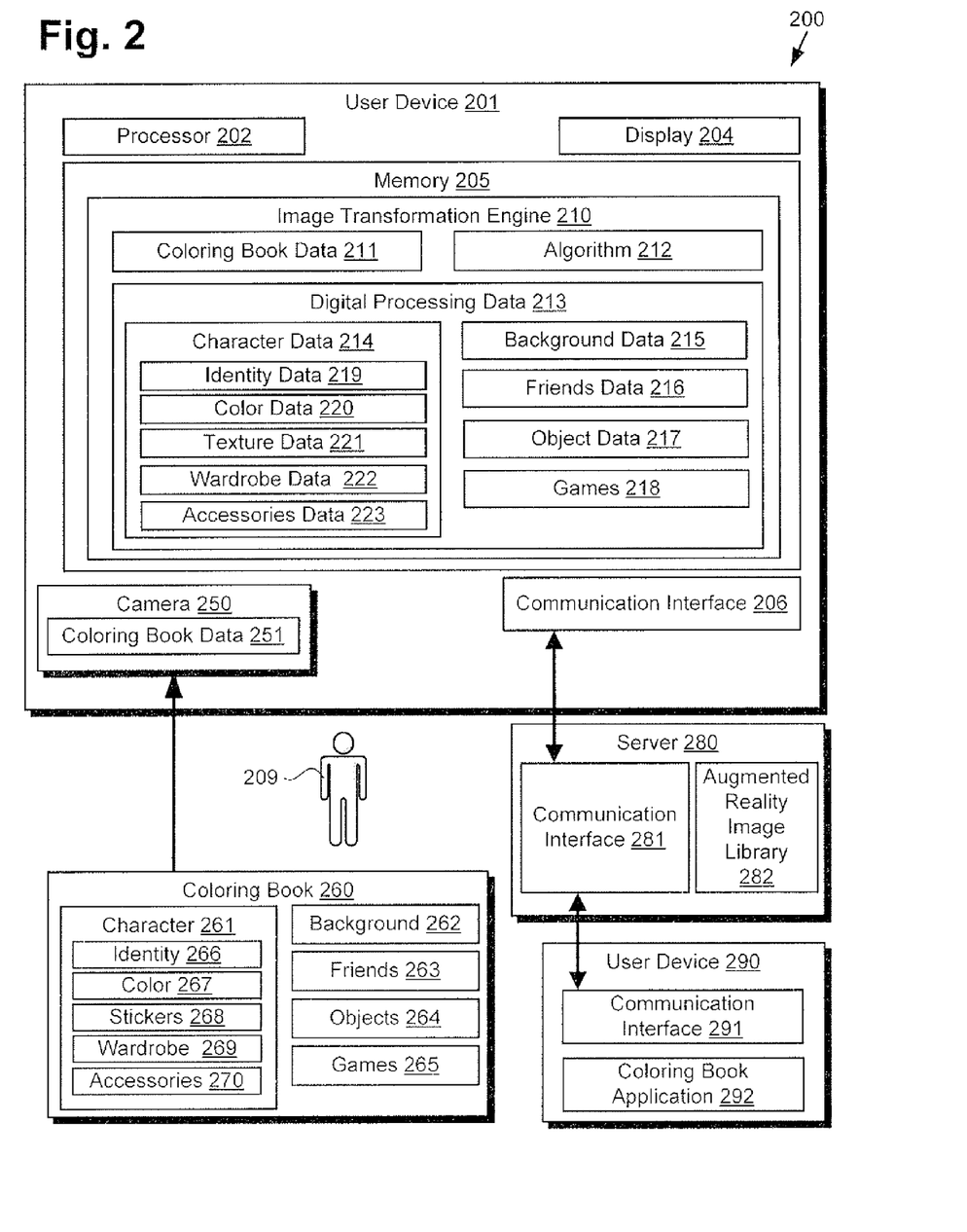
FIG. 2 shows another exemplary implementation of a system configured to perform augmented reality image transformation.

Continuing to FIG. 2, FIG. 2 shows another exemplary implementation of a system, depicted as user device 201, configured to perform augmented reality image transformation. As shown in FIG. 2, user device 201 includes system processor 202 and system memory 205 storing image transformation engine 210, as well as display 204, and camera 250. As further shown in FIG. 2, user device 201 is situated in augmented reality image transformation environment 200 with user 209, coloring book 260, server 280 and other user device 290.

User device 201, system processor 202, image transformation engine 210 in system memory 205, camera 250, and display 204 correspond respectively to system 101, system processor 102, image transformation engine 110 in system memory 105, image transformation input interface 150, and display 104, in FIG. 1, and may share any of the characteristics attributed to those corresponding features, above. Moreover, user 209 and coloring book 260, in FIG. 2, correspond respectively to user 109 and image source 160, in FIG. 1. It is noted that FIG. 2 shows a highly detailed and specific, but merely exemplary implementation of user device 201 including image transformation engine 210 configured to produce an augmented reality representation of an image created or modified by user 209 in coloring book 260. For example, user 209 may create or modify a printed image appearing on a page of coloring book 260, and use camera 250 of user device 201 to take a picture of the image in coloring book 260.

The picture may include, as shown in FIG. 2, character 261, background 262, friends 263, objects 264, and games 265. Character 260 includes a character or characters that user 209 of coloring book 260, who may be a child interacting with coloring book 260, is coloring. As such, character 260 includes identity 266, which is the identity character 261, color 267, which represent the color or colors user 209 has applied to character 261, stickers 268, which user 209 can apply to character 261 to identify texture and/or color, wardrobe 269, which include the clothes worn by character 261, and accessories 270, which are any accessories worn or used by character 261.

Background 262 may include the background of coloring book 260 that user 209 has colored around character 261. Friends 263 may include any friends of character 261 that are in coloring book 260, and may include animal friends such as pets. Objects 264 includes any objects that image transformation engine 210 can detect from coloring book 260. Games 205 includes any games that are included in coloring book 260 and may be associated with the user created or modified image, such as a word game, a puzzle, or a maze, for example.

After camera 250 of user device 201 is used to take a picture of coloring book 260, coloring book data 251 corresponding to the user created or modified image in coloring book 260 is received by image transformation engine 210 as image data in the form of coloring book data 211. Coloring book or image data 211 includes digital data from the user created or modified image in coloring book 260. As such, coloring book or image data 211 includes data about character 261, background 262, friends 263, objects 264, and games 265. After receiving coloring book or image data 211, image transformation engine 210, under the control of system processor 202, utilizes algorithm 212 to translate coloring book or image data 211 into digital processing data 213.

Digital processing data 213 includes all of the data necessary to synthesize a texture or textures corresponding to a feature or features of the image captured using camera 250, and to produce an augmented reality representation of the image having the texture(s) for display to user 209. As such, digital processing data 213 includes character data 214, background data 215, friends data 216, object data 217, and games 218. Character data 214 corresponds to the digital data of the augmented reality representation of the character and includes identity data 219, color data 220, texture data 221, wardrobe data 222, and accessories data 223.

Background data 215 corresponds to the digital data of the background of the digital world, friends data 216 corresponds to digital animated friends of the augmented reality representation of the character, object data 217 corresponds to digital animated objects recognized by image transformation engine 210, and games 218 corresponds to any digital animated games that were played by user 209. It is noted that in some implementations, image transformation engine 210 is configured to enable user 209 to interact with one or more games associated with the user created or modified image.

Augmented reality image transformation environment 200 is also shown to include server 280 including augmented reality image library 282, and other user device 290. In one implementation, image transformation engine 210 is configured to give user 209 the ability to interact with another user utilizing other user device 290 through use of an online multiplayer environment hosted on server 280. As illustrated in FIG. 1, each of user device 201 and other user device 290 are connected to communication interface 281 of server 280 by user device communication interfaces 206 and 291, respectively. While connected to server 280, user 209 and a user of other user device 290 can interact with each other in the online multiplayer environment that is generated and hosted by server 280. Moreover, in some implementations, image transformation engine 210 is further configured to enable user 209 to upload the augmented reality representation of the user created or modified image to augmented reality image library 282, which is accessible to a community of users including the user of other user device 290.

Figure 3:
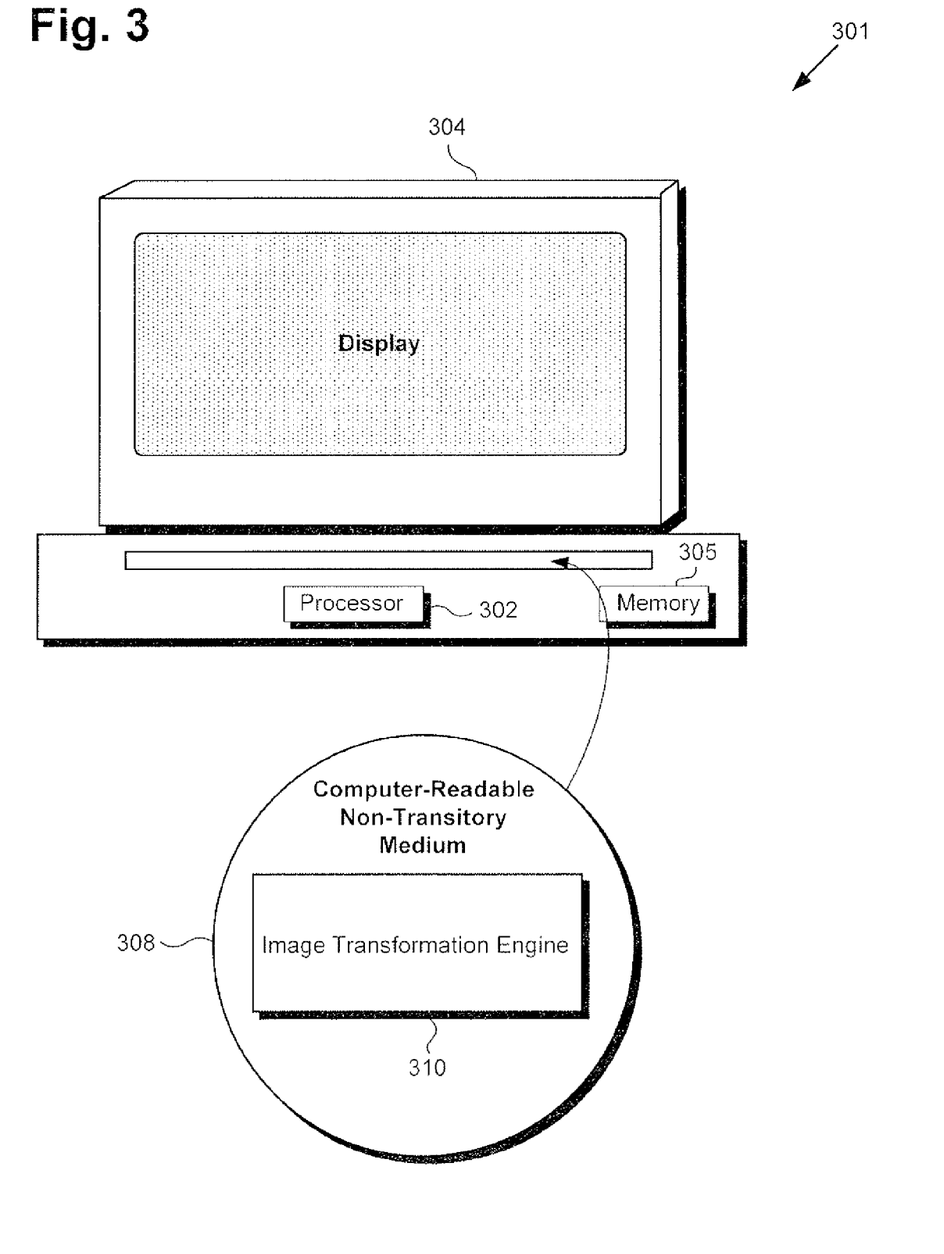
FIG. 3 shows an exemplary system and a computer-readable non-transitory medium including instructions enabling augmented reality image transformation, according to one implementation.

Moving now to FIG. 3, FIG. 3 shows an exemplary system and a computer-readable non-transitory medium including instructions enabling augmented reality image transformation, according to one implementation. System 301, in FIG. 3, includes processor 302, memory 305, and display 304. Also shown in FIG. 3 is computer-readable non-transitory medium 308 having image transformation engine 310 stored thereon. System 301 including processor 302, memory 305, and display 304 corresponds in general to system 101/201 including system processor 102/202, system memory 105/205, and display 104/204 in respective FIGS. 1 and 2. For example, in some implementations, processor 302 corresponding to system processor 102/202 may be part of a personal communication device.

The expression "computer-readable non-transitory medium," as used in the present application, refers to any medium, excluding a carrier wave or other transitory signal, that provides instructions to processor 302 of system 301. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 308 provides image transformation engine 310 for execution by processor 302 of system 301. Image transformation engine 310, when executed by processor 302, instantiates an image transformation engine on system 330 corresponding to image transformation engine 110/210, in FIGS. 1 and 2, and capable of performing all of the operations attributed to image transformation engine 110/210 by the present disclosure.

Figure 4:
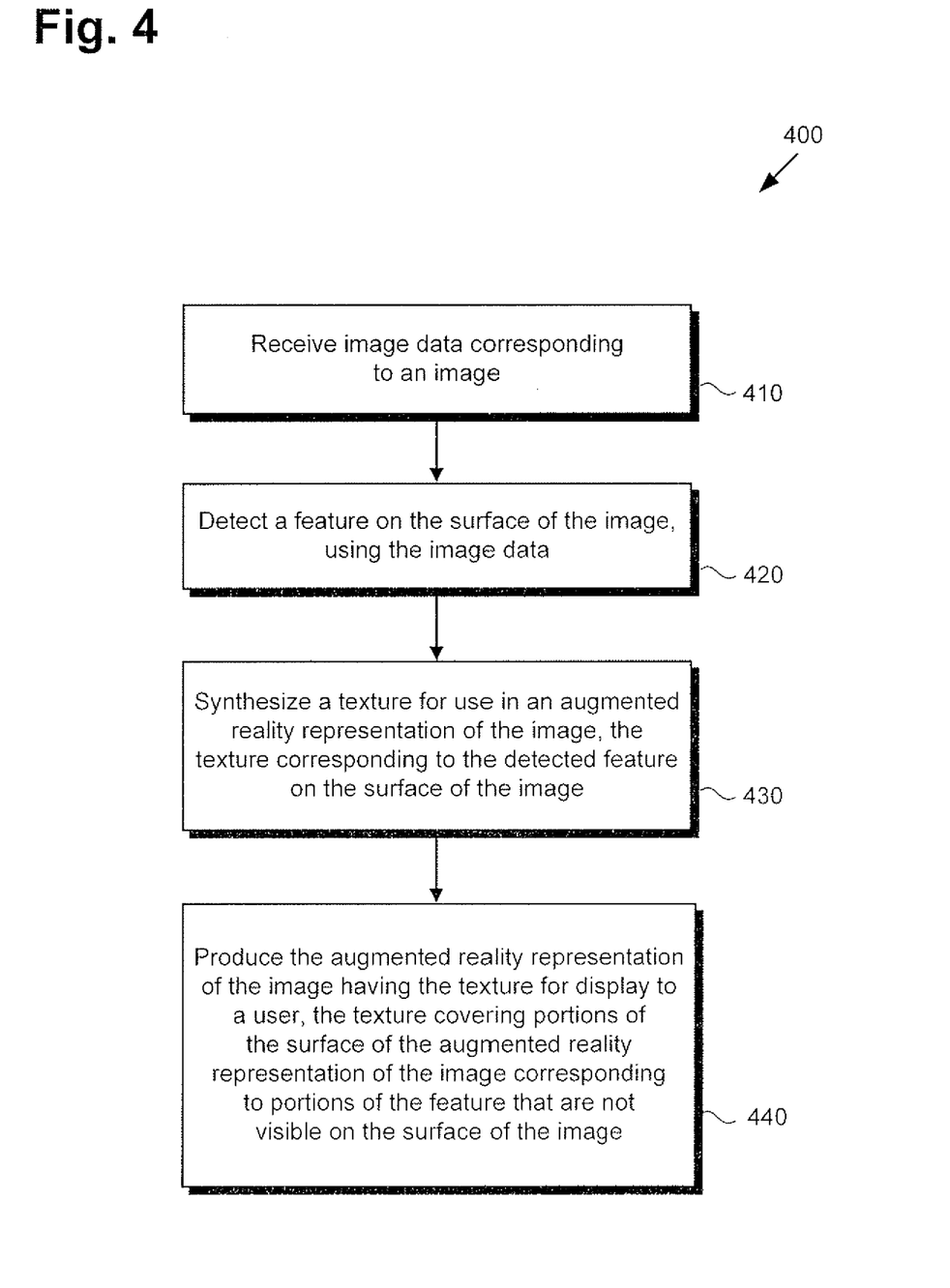
FIG. 4 is a flowchart presenting an exemplary method for use by a system to perform augmented reality image transformation.
Figure 5A:
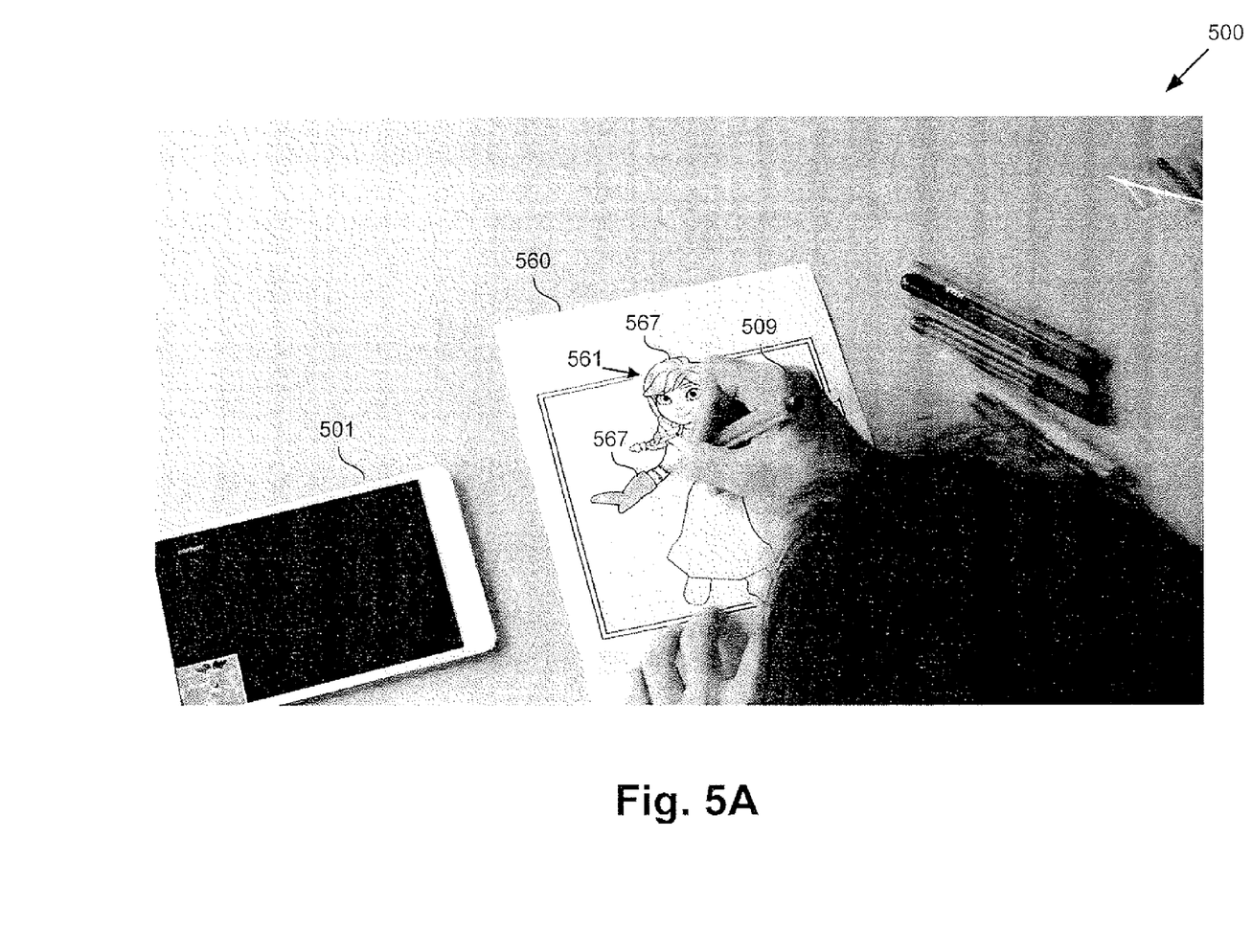
FIG. 5A shows an exemplary depiction of a user modified image suitable for transformation into an augmented reality representation of the image, according to one implementation.
Figure 5B:
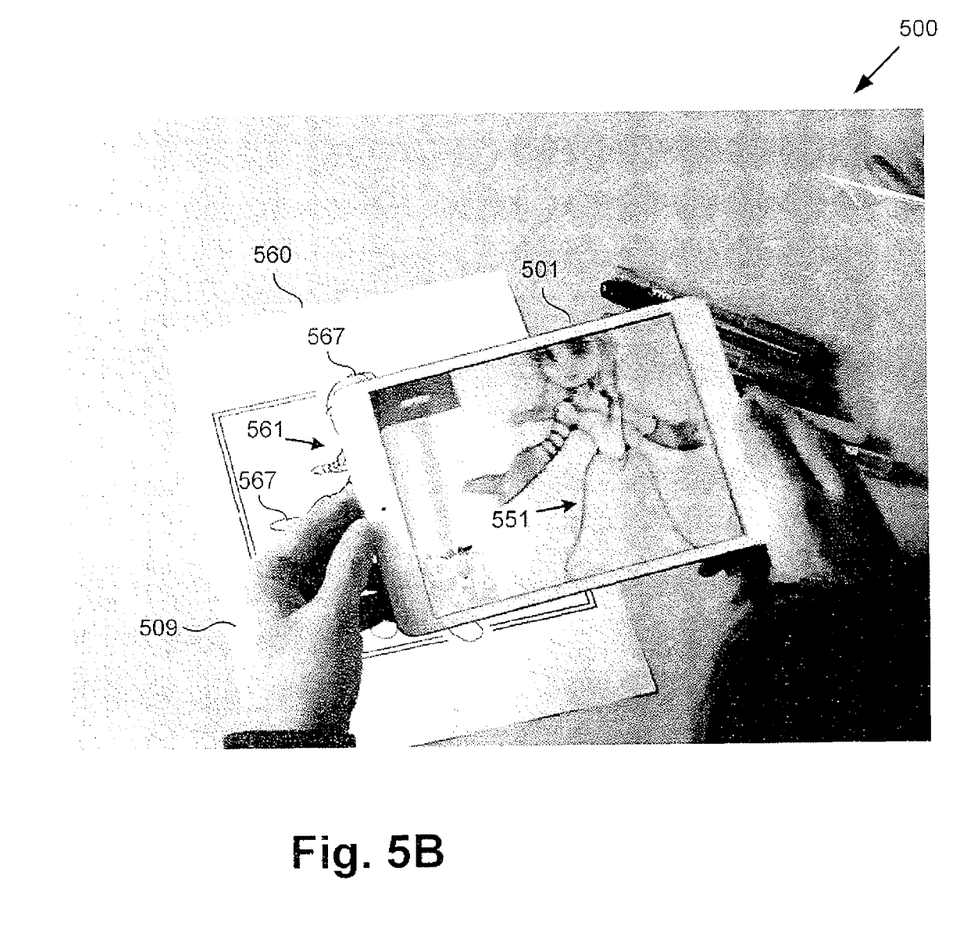
FIG. 5B shows the user modified image of FIG. 5A at an intermediate stage of transformation into an augmented reality representation of that image, according to one implementation.
Figure 6A:
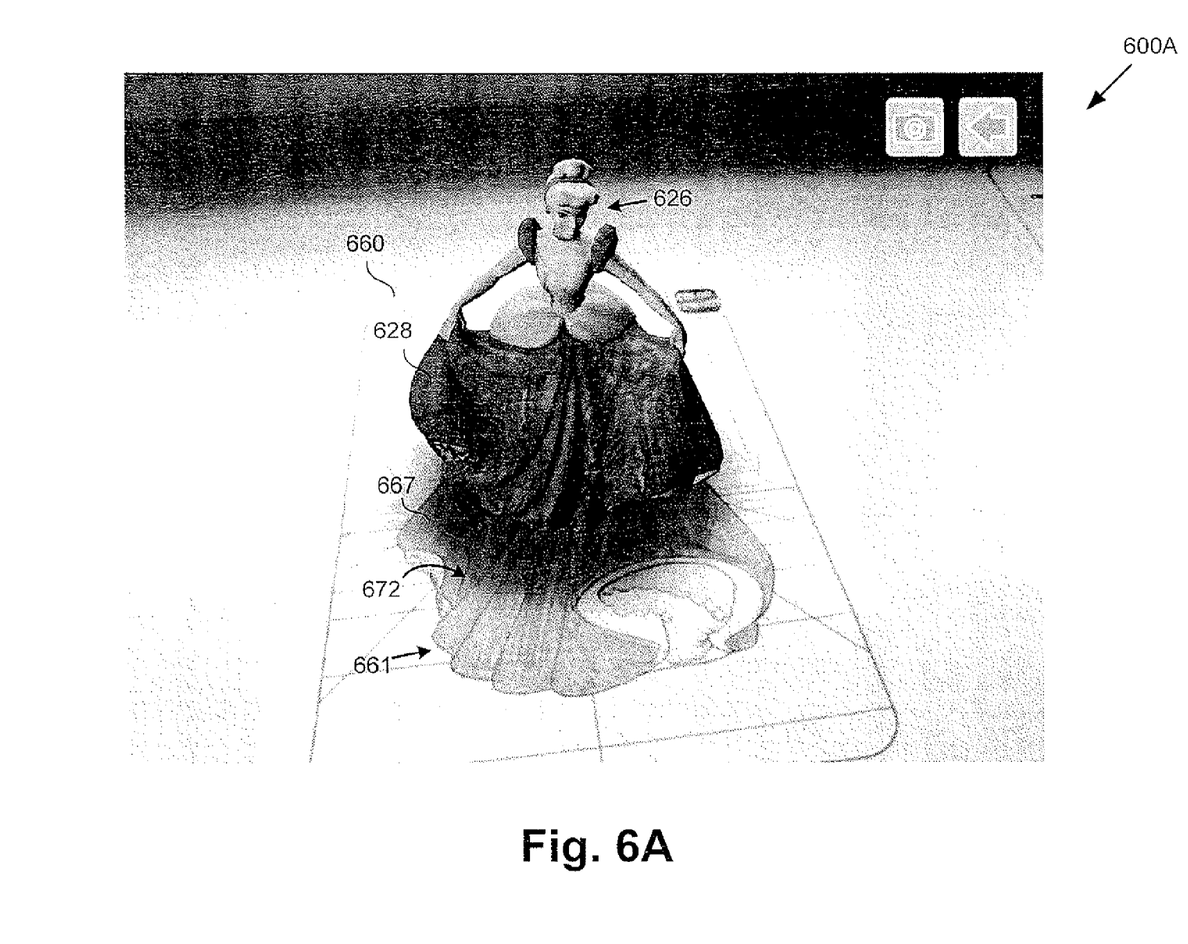
FIG. 6A shows an exemplary depiction of an augmented reality representation of a user modified image having a synthesized texture corresponding to a feature of the user modified image, according to one implementation.
Figure 6B:
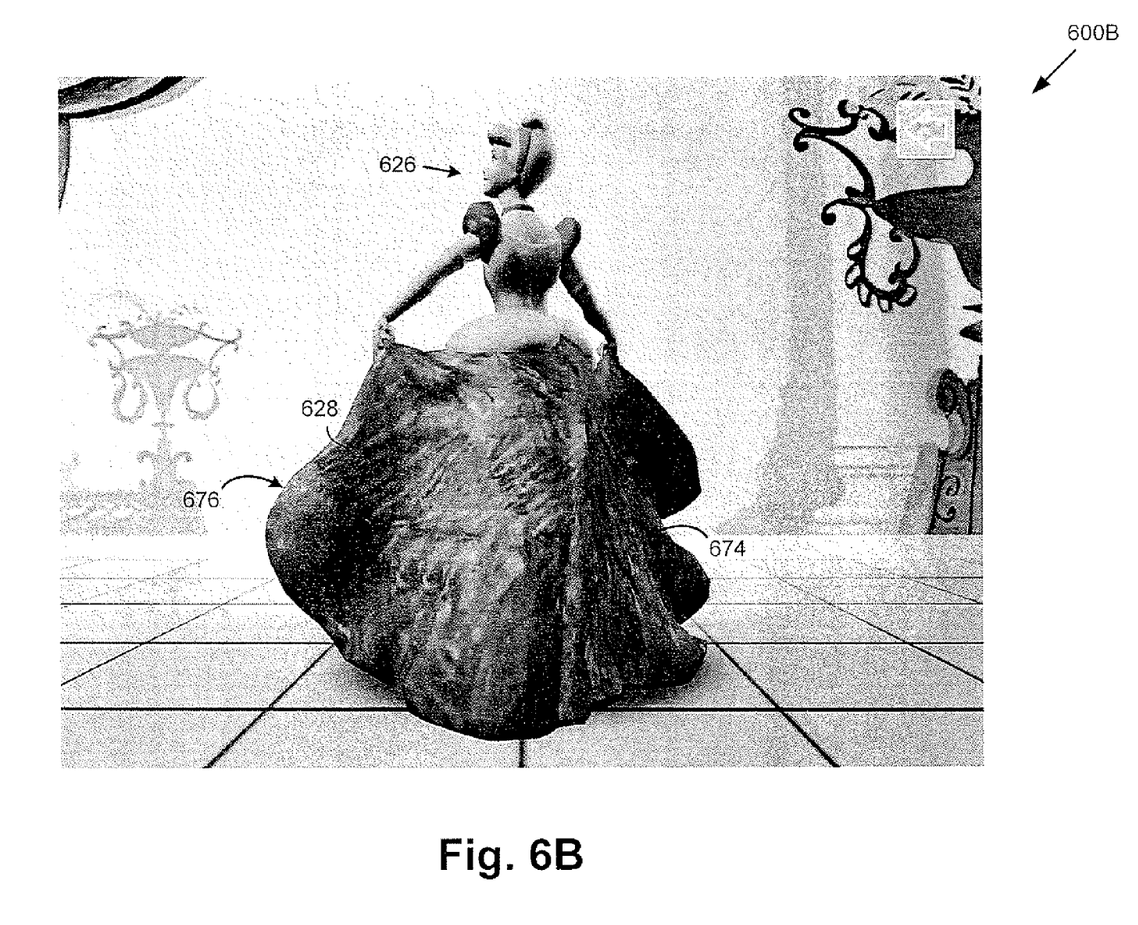
FIG. 6B shows the augmented reality representation of FIG. 6A having the synthesized texture on a surface of the augmented reality representation corresponding to a portion of the feature that is not present in the user modified image, according to one implementation.
Figure 7A:
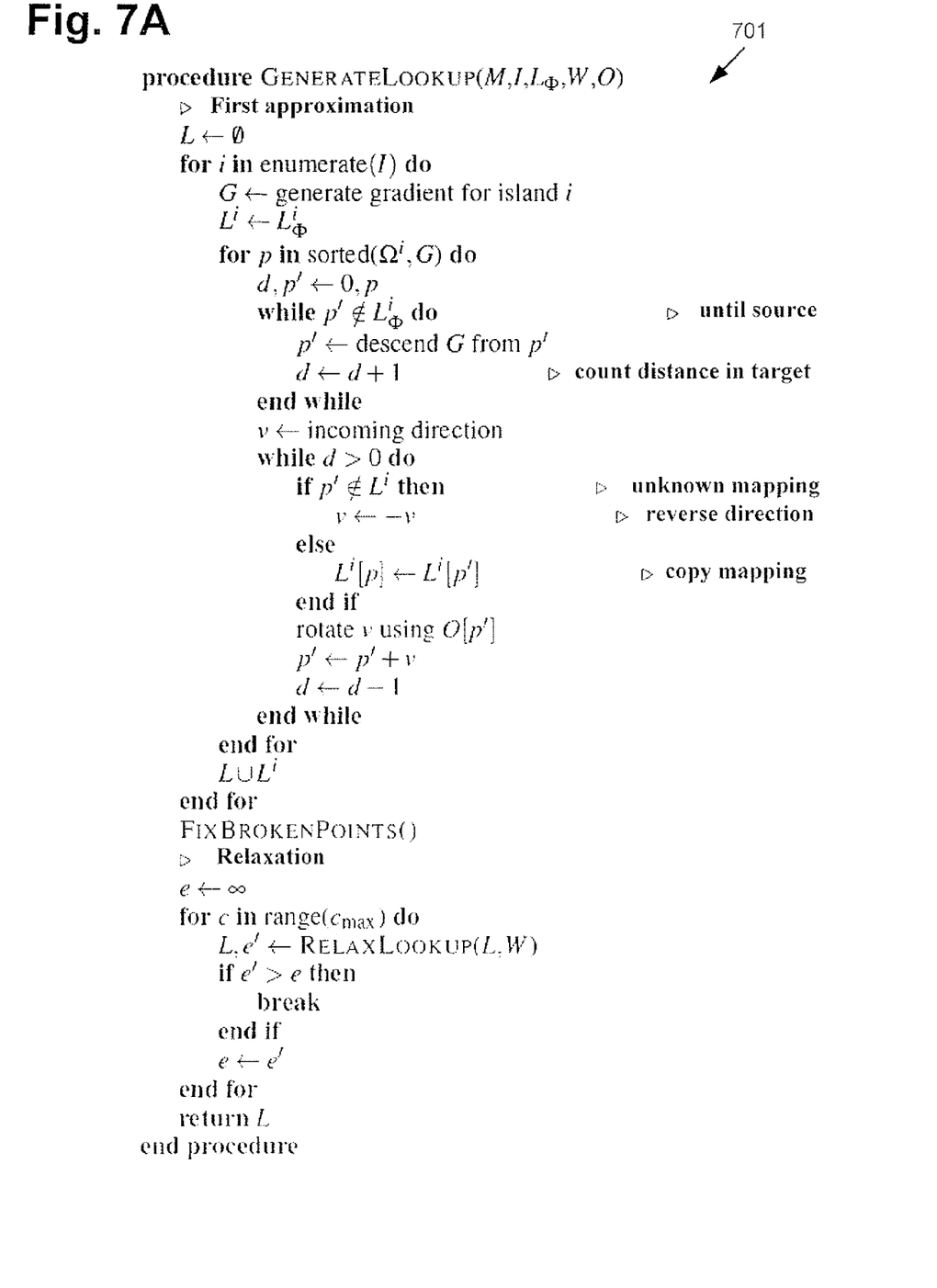
FIG. 7A shows an exemplary process flow suitable for use in performing texture synthesis of portions of a feature not visible on an image including other portions of the feature.
Figure 7B:
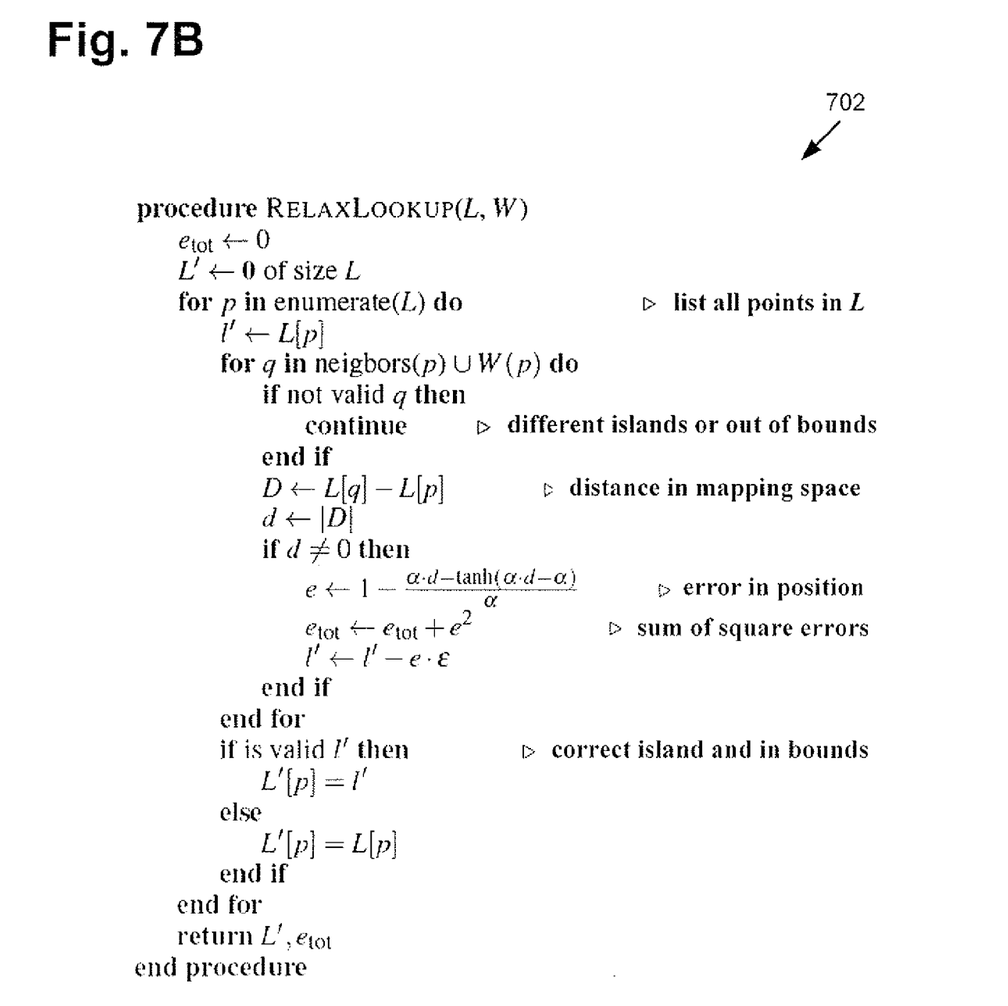
FIG. 7B shows another exemplary process flow suitable for use in performing texture synthesis of portions of a feature not visible on an image including other portions of the feature.

The present inventive concepts will now be further described with reference to FIG. 4 in combination with FIGS. 1, 2, 5A, 5B, 6A, 6B, 7A, and 7B. FIG. 4 is a flowchart presenting an exemplary method for use by a system to perform augmented reality image transformation. FIG. 5A shows an exemplary depiction of user modified image 561 suitable for transformation into an augmented reality representation of the image, while FIG. 5B shows user modified image 561 at an intermediate stage of transformation into an augmented reality representation of that image, according to one implementation. FIG. 6A shows an exemplary depiction of augmented reality representation 626 of user modified image 661 having synthesized texture 628 corresponding to feature 667 of user modified image 661. FIG. 6B shows synthesized texture 628 on a surface of augmented reality representation 626 corresponding to a portion of feature 667 that is not visible on user modified image 661. FIGS. 7A and 7B show exemplary process flows suitable for use in performing texture synthesis of portions of a feature not visible on a user modified image. With respect to the method outlined in FIG. 4, it is noted that certain details and features have been left out of flowchart 400 in order not to obscure the discussion of the inventive features in the present application.

Referring first to FIGS. 5A and 5B, those figures show augmented reality image transformation environment 500 including user 509, user device 501, and media 560 in the form of a coloring book page having character image 561 modified by user 509 through the addition of color 567. In addition, FIG. 5B shows coloring book data 551. It is noted that user device 501 corresponds in general to user device 201 in FIG. 2, as well as to systems 101/301 in FIGS. 1 and 3, while media 560, character image 561, and coloring book data 551 correspond respectively to coloring book 260, character 261, and coloring book 251, in FIG. 2. Thus, user device 501 includes a system processor and system memory storing an image transformation engine that are not shown as such in FIGS. 5A and 5B but correspond respectively to system processor 102/202 and system memory 105/205 storing image transformation engine 110/210 in FIGS. 1 and 2.

Referring now to FIG. 4 in combination with FIGS. 1, 2, and 5B, flowchart 400 begins with receiving image data represented by coloring book data 211 and corresponding to image 561 (action 410). The image data represented by coloring book data 211 may be received by image transformation engine 110/210 being executed by system processor 102/202. As shown in FIGS. 5A and 5B, in implementations in which media 560 is tangible media, the image data represented by coloring book data 211 and corresponding to image 561 may be produced by camera 250 of user device 201, which may be configured to transform character/character image 261/561 into digital coloring book data 251 under the control of system processor 102/202.

It is noted that although image 561 is shown as character image 561 corresponding to character 261, that representation is merely by way of example. The user created or modified image depicted by image 561 may be a character image, a background image, an image of a wardrobe item or accessory of the character, or a friend, object, or game appearing on media 560. More generally, the user created or modified image may be any image appearing on image source 160, coloring book 260, or media 560.

As also noted above, the user created or modified image represented by character image 561 in FIGS. 5A and 5B may be a 2D visual image appearing on a tangible medium corresponding to media 560 and taking the form of a sheet of paper, a page bound in a book or sketchpad, or an artist's canvas, for example. However, in some implementations, the user created or modified image represented by character image 561 may be all or a portion of a 3D physical object, such as a sculpture or model. Moreover, in some implementations, the user created or modified image represented by character image 561 may be an electronically produced image, such as an image produced by user 509 through use of an electronic drawing, painting, sculpting, or design application, for example.

Flowchart 400 continues with detecting a feature on a surface of the image (action 420). Referring to FIG. 6A, augmented reality image transformation environment 600A shows media 660 including user modified image 661 including feature 667 on surface 672 of image 661. Also shown in FIG. 6A is augmented reality representation 626 of image 661, which includes texture 628. Media 660 and character image 661 correspond respectively to coloring book 260 and character 261, in FIG. 2, as well as to media 560 and character image 561, in FIG. 5. Furthermore, augmented reality representation 626 having texture 667 corresponds in general to character data 214 of digital processing data 213 produced by image transformation engine 210, in FIG. 2. Feature 667 may include a color added by the user to image 661, and/or a surface pattern or surface texture added by the user, for example.

Detection of feature 667 can be performed by image transformation engine 110/210 executed by system processor 102/202, using coloring book data 211, for example. Detection of feature 667 may be performed in a number of different ways. In some instances, for example, a color feature may be detected through the identification of color added to image 661 by the user. In other instances, a color feature and/or surface pattern feature may be detected through identification of a symbol or figure added to image 661 by the user. Such a symbol may be represented by a tangible object added to image 661 by the user, such as stickers 268 indicating color and/or pattern preferences of the user.

In some implementations, image transformation engine 110/210 may be configured to include object recognition capability, thereby enabling detection of features introduced by the user by being hand drawn markings, such as shapes, on image 661. For example, user 209 of coloring book 260 may draw a necklace on image 661 and take a picture of a image including the necklace. Image transformation engine 110/210 may be configured to identify the drawing of the necklace as a necklace and unlock a necklace in the digital world for use as an accessory by augmented reality representation 626 of image 661. The augmented reality representation of the necklace may look similar to the necklace drawn by user 209 or may be substituted by a predetermined augmented reality representation of a necklace. As another example, the user 209 may hand draw the shape of a leaf on surface 672 of feature 667. Image transformation engine 110/210 may then detect the hand drawn leaf and interpret its presence as indicating that augmented reality representation 626 should include a leaf pattern as part of texture 628.

Flowchart 400 continues with synthesizing texture 628 corresponding to feature 667 (action 430). Synthesis of texture 628 may be performed by image transformation engine 110/210 executed by system processor 102/202. Synthesis of texture 628 may be performed using a pixel copying technique, and/or by UV mapping. For example, synthesis of texture 628 by image transformation engine 110/210 may be performed through an example based texture synthesis process in which user modified feature 667 serves as an exemplar. As noted above, such texture synthesis may also be augmented by techniques such as TBN, allowing the user to specify various additional constraints and texture areas for high quality, visually consistent renderings with user defined art direction.

Exemplary flowchart 400 concludes with producing augmented reality image 626 having texture 628 for display to the user, wherein texture 628 covers surfaces 674 and 676 of augmented reality image 626 corresponding to portions of feature 667 that are not visible on surface 672 of image 661 (action 440). Production of augmented reality image 626 having texture 628 may be performed by image transformation engine 110/210 executed by system processor 102/202. As shown by augmented reality scene 600B, in FIG. 6B, augmented reality representation 626 may be displayed to the user as a virtual 3D representation of original 2D image 661. Moreover, and as further shown by FIG. 6B, image transformation engine 110/210 may be configured to synthesize texture 628 on surfaces of augmented reality representation 626 of image 661 corresponding to portions of feature 667 that are not visible on image 661. For example, although only a frontal view showing surface 672 of feature 667 is shown by image 661, texture 628 is synthesized over portions of back surface 674 and sides 676 of augmented reality representation 626 of image 661.

Referring to FIG. 7A, FIG. 7A shows exemplary process flow 701 suitable for use in performing texture synthesis of portions of a feature not visible on an image including other portions of the feature. Given a UV mapped 3D model of an augmented reality representation of an image and its projection as the 2D image, the purpose of process flow 701 is to find suitable lookup coordinates on the image for the portions of the 3D model that are not visible on the image. Process flow 701 is an exemplary process flow for doing so under the constraints of continuity of the resulting texture between hidden and visible portions. In addition, it is desired that distortions be substantially minimized.

The variables used in process flow 701 include the following:
M, the 3D model with UV coordinates, and:
 $W^i$ the wrapping seams for island i, mapping some pixels of i together.
 O the orientation map in the UV space.
I, the island maps in the UV space which hold the different areas to be textured separately:
 $\Phi^i \in \Phi$ denotes the regions for island i visible in the drawing (source regions),
 $\Omega^i \in \Omega$ denotes the regions for island i not visible in the drawing (target regions),
 $L_\Phi$ and $L_\Omega$, the lookup maps which tell for every pixel of the UV map which pixel to read from the image, $L = L_\Phi \cup L_\Omega$:
 G a temporary rising gradient in $L^i_\Omega$, propagated from $L^i_\Phi$ for each island i.

Process flow 701 takes as input M, I, $L_\Phi$. Then, support functions generate W, O, and G. Finally, the generation process uses these to generate $L_\Omega$ and outputs L, to be used in real time for texture generation. It is noted that the island I and the model M can be arbitrarily pathological: some areas in $\Omega$ might be unconnected to $\Phi$, there can be saddle points in the gradient, and the like. Therefore, process flow 701 needs a procedure to recover from exception cases, and this is represented by FIXBROKENPOINTS( ) in process flow 701. While iterating over points in $\Omega$, process flow 701 collects all points that fail to reach a valid point in $\Phi$, and stores them for further processing. Then, for each of them it checks whether one of its neighbors is valid, and if so, copies its mapping. For the remaining points, which typically belong to unconnected regions in $\Omega^i$, it groups them in connected areas and attempts to copy a consistent mapping based on the center of the largest region in $\Phi^i$. If some pixels cannot be copied, process flow 701 assigns a point from $\Phi^i$.

Referring to FIG. 7B, FIG. 7B shows relaxation process flow 702, which as shown in FIG. 7A may be utilized in process flow 701. Process flow 702 considers that points L form a spring system. For each point, it attaches a spring to its neighbors (4-connectivity) and, if the point is on a seam, to the point on the other side of the seam (using seam map W). Then, for every spring, it determines the distance in L between the points on its two sides. In process flow 702, that distance should be 1 at rest, and any difference from 1 is considered an error e that has to be minimized using a factor $\epsilon$. It is noted that this distance may be weighted by a factor that accounts for distortion of the UV map.

In some implementations, the exemplary method outlined by flowchart 400 may include enabling the user to interact with augmented reality representation 626 of image 661 by entering inputs to user device 201/501 or system 101/301. For example, the user may enter inputs such as touch screen or mouse mediated inputs commanding movement of augmented reality representation 626 within augmented reality scene 600B, and/or interaction by augmented reality representation 626 with other augmented reality representations included in augmented reality scene 600B. Moreover, in some implementations, synthesis of texture 628 by image transformation engine 110/210 may be performed in real-time so as enable the user to interact with augmented reality representation 626 of image 661 in real-time as well.

Moreover, in some implementations, the method outlined by flowchart 400 may include enabling the user and another user remote from the user to collaboratively interact with augmented reality representation 626. Furthermore, in some implementations, the method may include enabling the user of coloring book 260/media 560 to interact with another coloring book/media through interaction of the user with coloring book 260/media 560. That is to say, markings or other modifications made to coloring book 260/media 560 by the user may result in corresponding changes being propagated to assets contained in the other coloring book/media. These additional possible actions of the method outlined in flowchart 400 may be performed by image transformation engine 110/210 executed by system processor 102/202.

Thus, the present application discloses a system and method for performing augmented reality image transformation. In some implementations, a user can interact with a virtual 3D representation of a tangible 2D image created or modified by the user. In addition, in some implementations, the user interactions with the augmented reality representations of images created or modified by the user can occur in real-time. As a result, the solution disclosed in the present application advantageously provides a typical user of media content dominated by visual imagery, such as an artist, draftsperson, or child, with an enhanced creative experience.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
 a system processor;
 a system memory; and
 an image transformation engine stored in the system memory;
 wherein the system processor is configured to execute the image transformation engine to:
  receive image data corresponding to a two-dimensional (2D) representation of an image;

detect a hand drawn modification added by a user to the 2D representation of the image;

synthesize a texture corresponding to the hand drawn modification added by the user to the 2D representation of the image; and produce a three-dimensional (3D) augmented reality representation of the image having the texture corresponding to the hand drawn modification added by the user for display to the user, wherein the texture corresponding to the hand drawn modification added by the user covers a surface of the 3D augmented reality representation of the image corresponding to a portion that is not visible in the 2D representation of the image, wherein the portion corresponds to a rear view of an object in the image, wherein the rear view is not visible in the 2D representation of the image.

2. The system of claim 1, wherein the system processor is configured to execute the image transformation engine to utilize at least one of a pixel-copying technique and UV mapping to synthesize the texture corresponding to the hand drawn modification.

3. The system of claim 1, wherein the system processor is configured to execute the image transformation engine to enable the user and another user remote from the user to collaboratively interact with the 3D augmented reality representation of the image.

4. The system of claim 1, wherein the system processor is configured to execute the image transformation engine to enable the user to interact with a game associated with the image.

5. The system of claim 1, wherein the image data is obtained from a three-dimensional physical object.

6. The system of claim 1, wherein the image data is obtained from a first coloring book, the system processor being configured to execute the image transformation engine to enable the user to interact with a second coloring book through interaction by the user with the first coloring book.

7. A method for use by a system including a system processor and an image transformation engine stored in a system memory, the method comprising:

receiving, by the image transformation engine being executed by the system processor, image data corresponding to a two-dimensional (2D) representation of an image;

detecting, by the image transformation engine being executed by the system processor, a hand drawn modification added by a user to the 2D representation of the image;

synthesizing, by the image transformation engine being executed by the system processor, a texture corresponding to the hand drawn modification added by the user to the 2D representation of the image; and producing, by the image transformation engine being executed by the system processor, a three-dimensional (3D) augmented reality representation of the image having the texture corresponding to the hand drawn modification added by the user for display to the user, wherein the texture corresponding to the hand drawn modification added by the user covers a surface of the 3D augmented reality representation of the image corresponding to a portion that is not visible in the 2D representation of the image, wherein the portion corresponds to a rear view of an object in the image, wherein the rear view is not visible in the 2D representation of the image.

8. The method of claim 7, wherein synthesizing the texture corresponding to the hand drawn modification comprises utilizing at least one of a pixel-copying technique and UV mapping to synthesize the texture.

9. The method of claim 7, further comprising enabling, by the image transformation engine being executed by the system processor, the user to interact with a game associated with the image.

10. The method of claim 7, further comprising uploading, by the image transformation engine being executed by the system processor, the 3D augmented reality representation of the image to an augmented reality image library accessible to a community of users.

11. The method of claim 7, further comprising enabling, by the image transformation engine being executed by the system processor, the user and another user remote from the user to collaboratively interact with the 3D augmented reality representation of the image.

12. The method of claim 7, wherein the image data is obtained from a three-dimensional physical object.

13. The method of claim 7, wherein the image data is obtained from a first coloring book, the method further comprising enabling, by the image transformation engine being executed by the system processor, the user to interact with a second coloring book through interaction by the user with the first coloring book.

14. A computer-readable non-transitory medium having stored thereon instructions, which when executed by a system processor, instantiate a method comprising:

receiving image data corresponding to a two-dimensional (2D) representation of an image;

detecting a hand drawn modification added by a user to the 2D representation of the image;

synthesizing a texture corresponding to the feature hand drawn modification added by the user to the 2D representation of the image; and producing a three-dimensional (3D) augmented reality representation of the image having the texture corresponding to the hand drawn modification added by the user for display to the user, wherein the texture corresponding to the hand drawn modification added by the user covers a surface of the 3D augmented reality representation of the image corresponding to a portion that is not visible in the 2D representation of the image, wherein the portion corresponds to a rear view of an object in the image, wherein the rear view is not visible in the 2D representation of the image.

15. The computer-readable non-transitory medium of claim 14, wherein synthesizing the texture corresponding to the hand drawn modification comprises utilizing at least one of a pixel-copying technique and UV mapping to synthesize the texture.

* * * * *